2,873,199

EMULSION COATING COMPOSITION CONTAINING SYNTHETIC DRYING OIL AND PROCESS OF MAKING IT

John F. McKay, Cranford, N. J., assignor to Esso Research and Engineering Company, a corporation of Delaware No Drawing. Application March 23, 1956
Serial No. 573,347

9 Claims. (Cl. 106—158)

This invention relates to the preparation of synthetic latices from synthetic polymeric drying oils. More particularly, it relates to the preparation of emulsions from such polymers which have been oxidized with air or oxygen.

Synthetic drying oils can be prepared by various methods from butadiene alone, or from mixtures containing butadiene together with materials copolymerizable therewith. Sodium polymerization, emulsion polymerization, as well as bulk or mass polymerization in the presence of a diluent and a peroxide-type catalyst have been used for this purpose in varying degrees of success. However, among the difficulties encountered with various synthetic drying oils were poor drying rate, poor flexibility and poor adhesion of air-dried coatings, poor wetting properties and consequent difficulty of grinding-in pigment, poor gloss and streakiness of brush enamel films prepared therefrom. While some of these advantages have been overcome in the past, corrective measures employed usually have resulted in aggravation of other undesirable characteristics. In general, the sodium catalyzed polymers have been found to be the most economical to produce and to have a good drying rate, but at the same time this type of drying oil was found to have particularly poor pigment wetting power and enamels prepared therefrom gave dull and very streaky films by brushing.

Most of these disadvantages can be overcome by oxidizing the oily copolymer by blowing with air or oxygen in the presence of a solvent, preferably aromatic and preferably with a catalyst such as a small amount of a metal naphthenate or other drier. These oxidized oils contain up to about 20% oxygen and have much improved pigment-wetting characteristics. However, the oxidized product generally has very poor viscosity stability, often becoming too viscous to handle even after comparatively short storage periods.

It has now been discovered that the difficulties inherent in the oxidized product can be circumvented by converting the oxidized oils to the form of an emulsion. Such emulsions are especially useful in the formulation of emulsion or latex paint which have been found to be superior to emulsion paint prepared from non-oxidized synthetic drying oils.

The synthetic oils to which the present invention are applicable are oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e. g. with 5–30% of styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight run mineral spirits boiling between 150 and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution consists typically of about 60 parts of oily polymer of butadiene, about 4 parts of butadiene dimer, plus solvent and some tertiary butyl alcohol. This solution of polymer is then preferably fractionated to remove the dimer and usually adjusted to 50% non-volatile matter content. The non-volatile constituent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U. S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3, 20 parts of styrene, 200 parts of straight run mineral spirits boiling between 150 and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid and filtered. Instead of neutralizing the alcohol treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 to 5,000.

Again it will be understood that the described sodium polymerization method may be varied considerably as by omitting the styrene co-reactant; or by adding the styrene only after the polymerization of butadiene monomer had begun; or dioxane may be replaced by 10 to 35 parts of another ether modifier having 3 to 8 carbon atoms such as methyl ethyl ether, dibutyl ether or phenetole; or the modifier may be omitted altogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° C. and 250° C., preferably between 60 and 200° C., e. g., butane, benzene, xylene, naphtha, cyclohexane and the like. The diluents are usually used in amounts ranging from 50 to 500 parts per 100 parts of monomer. The reaction temperature may vary between about 40° C. and 100° C., preferably around 65 to 85° C. As a catalyst, 0.1 to 10 parts of dispersed metallic sodium is used per 100 parts of monomers, sodium particle sizes below 100 microns being particularly effective.

The blowing of the above polymeric drying oils with air or oxygen is best carried out in a solvent of moderate to good solvency, e. g., solvents or solvent mixtures having a kauri butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvent(s) from the start, thereby eliminating low solvency solvents. The choice of solvents will, of course, depend on the oxygen content which is desired in the finished oil as well as on the formulations of the coating compositions which are to be made from the blown oil, and in the interest of economy it is generally desirable to use the cheapest solvent(s) which possess the needed attributes of kauri butanol value and compatibility with the various ingredients of the finished coating vehicle which is to be formulated.

Examples of suitable solvents include aromatic or mixtures of aromatic and aliphatic hydrocarbons boiling up to about 250° C. The aromatic solvent may be benzene, toluene, hemi-mellitene, pseudocumene, mesitylene, propyl benzene, cymene, ethyl toluene, methyl ethyl benzene, xylenes, Solvesso 100 (a mixture of aromatic hydrocarbons boiling from about 150 to 175° C.), Solvesso 150 (a mixture of aromatic hydrocarbons boiling from about 190 to 210° C.) or mixtures thereof. Other suitable solvents include the Varsols which are straight run mineral spirits boiling in the range of 140 to 205° C., having API gravities of 40 to 55 and varying in aromatic content from 5 to 35 wt. percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalysts, type of solvent, etc. In general, greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more.

According to this invention, a liquid polymer oil resulting from an alkali metal catalyzed polymerization and subsequent oxidation in the manner described is treated with a mixture of anionic and a non-ionic emulsifying agent. It is preferable to prepare the emulsion in the presence of the solvent used in preparing the oxidized oil and then to strip the solvent from the resulting latex by vacuum, steam-stripping or other suitable methods. The emulsion can be readily made by the use of a colloid mill, although it may also be made in other types of equipment such as a Premier Dispersator, a Waring Blendor, a Rapisonic Homogenizer, etc. It is important to add the water and emulsifying agent to the colloid mill or other dispersing equipment first and then to slowly add the oxidized oil.

The anionic emulsifiers useful in certain combinations include sodium lauryl sulfate, the sodium salt of the sulfonate of the polyoxyethylated alkyl phenol, and the sodium oleyl taurate prepared by condensing abietic acid or tall oil acid with sodium methyl taurine. The non-ionic emulsifiers found useful are the polyether alcohols having the formula

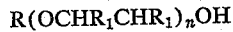

$$R(OCHR_1CHR_1)_nOH$$

where R is an alkyl, aryl or alkaryl group, $R_1$ is an alkyl group or hydrogen and $n$ is an integer of 4 to 8 to 10 or even higher. These compounds are prepared by condensing an alkyl phenol or an alcohol with an alkene oxide such as ethylene oxide or propylene oxide. The alkene oxide units should represent at least 40% of the total molecular weight of the compound. Commercial compounds which have been found useful in connection with the present invention include certain of the polyoxyethylated octyl phenols, such as Triton X–100 (containing 8 to 10 ethylene oxide units) or Triton X–45 (containing 5 ethylene oxide units) or a polyoxyethylated nonyl phenol such as Igepal CO–430 (containing 4 ethylene oxide units) or the polypropylene glycol-ethylene oxide condensation product in which the ethylene oxide units represent 80–90% of the molecular weight and the polypropylene glycol has a molecular weight of 1501 to 1800. A typical trade composition having this formula is Pluronic F–68.

In accordance with one specific embodiment of this invention it has been discovered that a very effective emulsifier which produces excellent latices having very great mechanical and chemical stability consists of a mixture of 10 parts of the polyoxyalkenated alkyl phenol or alcohol and 1 part of sodium lauryl sulfate.

The initial amount of emulsifier to be used may vary but a desirable amount is enough to leave 2 to 5.0 wt. percent, based on the polymer, in the final latex. A suitable amount has been found to be 5 to 7%, or up to 20% can be used if desired.

It is also desirable to add an emulsion stabilizer. Polyvinyl alcohol used in amounts of 1 to 3% has been found to be particularly suitable for this purpose.

It is preferred to use distilled water or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the emulsion is not critical as long as there is enough water present to produce a stable water-reducible emulsion. Accordingly, therefore, for shipping purposes, as concentrated an emulsion as possible is desirable. The emulsion may be reduced at the time of application by adding whatever water is desired to provide a good working consistency.

The resulting latex may be used to lay down clear films suitable either for air-drying or baking. Driers preferably of the emulsifiable type may be added if desired. Suitable driers for this purpose include cobalt, manganese or lead soaps of fatty acids.

The latex prepared as described above can be used as the binder in an emulsion paint. Such paints contain protective colloids and thickeners and even pigments where desired.

The protective colloid may be casein or soya protein alone or in mixture with each other, with or without minor additions thereto of alginates or other organic protective colloids or other alkali-soluble proteins or mixtures of proteins with each other or with other organic colloids.

Dispersions of proteins in water are usually prepared separately from the emulsion by using any of the usual "cutting" or dispersing methods and reagents. However, since the alkalies generally used for such purposes ultimately are deposited in the dry film of coating composition and impair its water resistance, it is preferred to use as little of such alkalies as possible and to supplement such alkalies with hydroxy amines. The dispersions may be made up to contain from about 17.5% to 18% total solids, with about 14% protein, but more or less concentrated dispersions may be employed since the concentration thereof only affects the amount of water which is added otherwise in preparing or applying the completed emulsion. The total weight of protective colloid should preferably not be greater than about one-sixth of the weight of the film-forming materials. Such large concentrations are seldom necessary in a system to effect the necessary stabilization of the emulsion and it is preferred to keep the concentration as low as practicable to provide sufficient stability. As little protein colloid as 5% by weight of the varnish may frequently be adequate for this purpose, but is generally preferred to use between about 8% and 12% on a weight basis. When non-proteinaceous colloids are used, the minimum concentration varies with particular colloid and is best determined by experiment, as described below. Two percent or more of methylcellulose has been found suitable.

The primary purpose of the thickener solution is to give body to the paint. However, it also acts as a protective colloid. Often, one material is satisfactory to serve the dual purpose of protective colloid and thickener. However, when the protective colloid does not increase body sufficiently, an additional thickening material may be added. Materials used for these purposes may be either natural or synthetic. Natural types include such materials as casein, protein, starch, alginates, and zein. Synthetic types include such materials as methyl cellulose, polyvinyl alcohol, and sodium salts of polyacrylates. They are used in amounts varying from about 2 to 20%, based on the vehicle solids.

In formulating the emulsion paints, it is desirable to use high-hiding pigments. Titanium dioxide is such a pigment and is very satisfactory, particularly because it is also a relatively inert pigment. In brief any pigment commonly used in paint and which is not alkali-reactive is suitable. It is preferred to use pigments such as lithopone, titania, cadmium sulfide colors, cadmium sulfoselenide colors, iron oxide colors and ultramine blues, and as indicated, the high-hiding pigments of these classes and types are preferred particularly. Inert fillers may also be used for their usual purpose as bulking agents to lower the cost of the paint.

The emulsion paints of this invention are pigmented in respect to the polymer oil or film-former content in about the same proportions customarily used in oil paints; that is, a pigment varnish ratio of up to about 1 volume of pigment to about 1 volume of film-former may be employed. If lower specular gloss is desired, then the ratio of pigment to film-forming material may be increased.

It is generally desired to prepare separately (1) the emulsion of the polymer oil with a part of the total water, (2) the stabilizing colloid dispersion, (3) the pigment dispersion and (4) the thickener solution. These are then mixed in the following approximate proportions:

|  | Weight percent |
|---|---|
| Pigment dispersion | 45–55 |
| Protective colloid: | |
| Protein solution | 5–15 |
| or | |
| Organic colloid | 2–8 |
| Polymer emulsion | 20–30 |
| Thickener solution | 7–10 |
| Water | Balance |

The following specific examples are presented to illustrate typical applications and effects of the present invention. All quantities are expressed in this specification and claims on a weight basis unless stated otherwise.

*Example I*

A butadiene-styrene drying oil was prepared from the following charge:

|  | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight run mineral spirits; API gravity, 49.0; flash, 105° F.; boiling range, 150 to 200° C.; solvent power, 33–37 kauri-butanol value (reference scale: benzene—100 K. B. value, n-heptane 25.4 K. B. value).
[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N. V. M. The resulting product had a viscosity of 1.5 poises at 50% N. V. M. in Varsol solution and the non-volatile portion thereof had an average molecular weight of about 3,000.

The polymer oil thus obtained was dissolved in Solvesso 150 (a substantially 100% aromatic hydrocarbon cut boiling 365–415° F.) to make a 35% N. V. M. solution. It was then blown with air at about 230° F. until the oxygen content reached 12.6% (based on polymer). Solvent was then stripped until the N. V. M. reached 53.9%. The Gardner viscosity of the oil was 5.5 poises at 50% N. V. M. 1200 grams of the resulting oxidized oil was slowly added to a colloid mill provided with a small clearance and to which had already been charged 964 grams distilled water, 38 grams of Triton X–100, and 12 grams of sodium lauryl sulfate (30% active component). A good oil-in-water emulsion was formed. 80 grams of a 10% solution of polyvinyl alcohol was then added to stabilize the emulsion.

The Solvesso 150 was then stripped from the emulsion by vacuum steam distillation, keeping the still pot at 60–70° C. and the pressure at 140–160 mm. Hg. More water was occasionally added to the still. Distillation was stopped when a major part of the Solvesso 150 was removed. The latex product had a N. V. M. of 48.9%, a pH of 3.4, a Stormer viscosity of 45 K. U. and contained 4.5% residual Solvesso 150. Electron micrographs of the latex showed that average particle size was less than one micron. The chemical stability was excellent since no inversion of the emulsion occurred when it was stirred 15 minutes at 10,000 R. P. M.'s in a Waring Blendor. A 3 mil wet film cast on glass dried to form a smooth continuous film.

Example II

The polymer of Example I was dissolved in Solvesso 100 (a substantially 100% aromatic hydrocarbon cut boiling 315–350° F.) to make a 35% N. V. M. solution and then blown with oxygen at 240–250° F. until the oxygen content reached 9.7% (based on polymer).

300 grams of the resulting oxidized oil was slowly added to a Premier Dispersator unit containing 368 grams distilled water, 3 grams Triton X–100 and 6 grams of sodium lauryl sulfate (30% active component). After stirring at moderate speed, 20 grams of a 10% solution of polyvinyl alcohol was added to stabilize the resulting emulsion. The Solvesso 100 was stripped as described in the previous example. The product latex had an N. V. M. of 41.4% and a pH of 3.6. A film cast on glass formed a continuous coating.

Example III

The oxidized oil emulsion described in Example I was used to make an emulsion paint according to the recipe following:

ALPHA PROTEIN STOCK SOLUTION

| Material: | Weight, g. |
|---|---|
| Alpha protein (Glidden) | 66 |
| Ammonia | 5.4 |
| Sodium pentachlorophenate | 16.2 |
| Water | 590.4 |

Stirred on a hot plate until solution was effected.

PIGMENT DISPERSION

| Material: | Weight, g. |
|---|---|
| Titanium dioxide (LW) | 37.16 |
| Lithopone | 20.20 |
| Kaolin | 4.42 |
| Tetrasodium pyrophosphate | 0.28 |
| Alpha protein stock solution | 31.9 |
| Pine oil | 0.84 |

Grind twice on a 3 roll paint mill.

The following ingredients were added to the above pigment dispersion with mild stirring:

| Material: | Weight, g. |
|---|---|
| Alpha protein stock solution | 31.9 |
| Latex of Example I | 68.0 |
| Emulsifiable cobalt drier (as Co metal) | .007 |
| Water | 30.0 |

The resulting latex paint had a pH of 7.35 and a Stormer viscosity of 79 Krebs units. Painted or sprayed films dried tack-free in 15 to 20 minutes.

The nature of the present invention having been thus fully set forth and specific examples of the same given, what is claimed as new and useful and desired to be secured by Letters Patent is:

1. The preparation of a synthetic latex from a polymeric mass obtained by the polymerization of a conjugated diolefin of 4 to 6 carbon atoms which comprises treating said polymeric mass with oxygen at a temperature between 20° and 250° C. in the presence of a hydrocarbon solvent and emulsifying a solution of said oxidized polymer in the same solvent in which it was treated with oxygen by agitating it with water in the presence of a mixture of sodium lauryl sulfate and a polyether alkylated phenol emulsifier having the formula $R(OCH_2CH_2)_nOH$ where R is chosen from the group consisting of $C_8H_{15}.C_6H_4-$ and $C_9H_{17}.C_6H_4-$, and $n$ associated with $C_8H_{15}.C_6H_4-$ is chosen from the group consisting of 5 and 8 to 10, and $n$ associated with $C_9H_{17}.C_6H_4-$ is 4.

2. A water reducible alkaline emulsion coating composition comprising a dispersion in water of an oxidized polymer of a conjugated diolefin of 4 to 6 carbon atoms, 2 to 5 wt. percent, based on the polymer, and at least 2 wt. percent, based on the polymer, of a protective colloid and a mixture of sodium lauryl sulfate and a polyether alkylated phenol emulsifier having the formula $R(OCH_2CH_2)_nOH$ where R is chosen from the group consisting of $C_8H_{15}.C_6H_4-$ and $C_9H_{17}.C_6H_4-$, and $n$ associated with $C_8H_{15}.C_6H_4-$ is chosen from the group consisting of 5 and 8 to 10, and $n$ associated with $C_9H_{17}.C_6H_4-$ is 4.

3. Process according to claim 1 in which the polymeric mass is a copolymer of butadiene and styrene.

4. A coating composition according to claim 2 in which the polymer is a copolymer of butadiene and styrene.

5. A coating composition according to claim 2 in which the protective colloid is methyl cellulose.

6. A coating composition according to claim 2 in which the protective colloid is 5 to 16⅔ wt. percent of an alkali-soluble protein.

7. A process according to claim 1 in which the phenol is polyoxyethylated octyl phenol containing 8 ethylene oxide units.

8. A process according to claim 1 in which the diolefin is butadiene.

9. A process according to claim 1 in which the oxygen treated polymer contains from a trace to 20% of oxygen.

References Cited in the file of this patent

UNITED STATES PATENTS

| 1,965,191 | Hyman | July 3, 1934 |
|---|---|---|
| 2,321,270 | Bacon et al. | June 8, 1943 |
| 2,595,797 | Leyonmark et al. | May 6, 1952 |
| 2,613,156 | McGaffin et al. | Oct. 7, 1952 |
| 2,674,586 | Welch | Apr. 6, 1954 |
| 2,677,700 | Jackson et al. | May 4, 1954 |
| 2,728,684 | Darragh | Dec. 25, 1955 |
| 2,755,194 | Volkmann et al. | July 17, 1956 |
| 2,760,884 | Graf | Aug. 28, 1956 |

OTHER REFERENCES

See article by Stieg, Titanium Corp., entitled "Continuous Film Producting Emulsion Paints," on pp. 9, 24, 26 and 28 of the publication "Paint, Oil and Chemical Review," June 28, 1945.